(12) United States Patent
MacKenzie

(10) Patent No.: US 6,293,177 B1
(45) Date of Patent: Sep. 25, 2001

(54) WORKPIECE POSITIONING DEVICE

(76) Inventor: George L. MacKenzie, 884 Temple St., Duxbury, MA (US) 02332-2929

( * ) Notice: Subject to any disclaimer, the term of this patent is extended or adjusted under 35 U.S.C. 154(b) by 0 days.

(21) Appl. No.: 09/553,293

(22) Filed: Apr. 20, 2000

(51) Int. Cl.[7] .................................................. B26D 7/02
(52) U.S. Cl. ..................... 83/467.1; 83/522.19; 83/468.7
(58) Field of Search ............................ 83/522.19, 467.1, 83/468.7, 468, 468.2; 269/303, 304, 315; 33/484–487, 809, 613

(56) References Cited

U.S. PATENT DOCUMENTS

| 4,137,643 | * | 2/1979 | Carmel ..................................... 33/180 |
| 4,206,910 | | 6/1980 | Biesemeyer . |
| 4,336,655 | * | 6/1982 | Thingstad ................................. 33/161 |
| 4,662,077 | * | 5/1987 | Richardson ............................. 33/296 |
| 4,693,158 | | 9/1987 | Price . |
| 4,793,604 | | 12/1988 | Taylor . |
| 5,018,562 | * | 5/1991 | Adams ..................................... 83/437 |
| 5,092,058 | | 3/1992 | Luttmer et al. . |
| 5,215,296 | | 6/1993 | Adams et al. . |
| 5,337,641 | * | 8/1994 | Duginske ............................. 83/468.2 |
| 5,642,569 | * | 7/1997 | Palmer ..................................... 33/809 |
| 5,716,045 | | 2/1998 | Talor . |
| 5,768,966 | * | 6/1998 | Duginske ............................. 83/468.7 |
| 5,845,555 | * | 12/1998 | Dawley ................................. 83/467.1 |

\* cited by examiner

Primary Examiner—M. Rachuba
Assistant Examiner—Omar Flores Sánchez
(74) Attorney, Agent, or Firm—Lambert & Associates,PLLC; Gary E. Lambert; Edward Timmer

(57) ABSTRACT

The present invention provides a workpiece positioning device for precisely positioning a workpiece in a predetermined position relative to a power tool or other device quickly and efficiently. This device provides a simple and dependable apparatus for quickly and easily positioning a workpiece, and adjusting the position of the workpiece in small increments. The workpiece positioning device includes a fence member, having a surface thereon for abutting against a workpiece, the fence being disposed adjacent to a locator member for limited slideable movement right and left thereof, whereby a workpiece abutting the fence will be exactly located in the precise position selected.

15 Claims, 8 Drawing Sheets

WORKPIECE POSITIONING DEVICE

FIELD OF THE INVENTION

The present invention relates to equipment designed to position a workpiece accurately in a predetermined position relative to a reference point, and more particularly to a workpiece positioning device for precisely positioning a workpiece relative to a power tool or other device quickly and efficiently and which is very dependable, economical to produce and adaptable to a wide variety of machines and power tools.

BACKGROUND

When using a machine designed to alter or cut a material such as wood, metal, plastic, or other matter, it is usually necessary to position the workpiece accurately relative to the cutting tool to ensure the proper dimensions of the workpiece after the machining process. The procedure of positioning a workpiece relative to a cutting tool is often a repetitive procedure which is a critical step in the manufacturing process. The quality of the work product usually depends heavily on the accuracy of the positioning of the workpiece. A dependable method of accurately positioning the workpiece prior to a cutting procedure minimizes the waste of incorrectly cut stock.

In many situations when using a cutting tool it is necessary to make numerous cuts of different dimensions requiring the operator to reset a locator member or fence relative to the cutting tool many times, in other situations, pieces of the same size may be needed at different times requiring the user to accurately reset the locator member repetitively to the same position. A mechanical positioning device is proven to be a useful to accurately position a workpiece relative to a cutting tool and can be used with a wide variety of machines and power tools.

There are many mechanical positioning devices presently available having the ability to accurately position a workpiece relative to a power tool. However, many of the positioning devices available with highly accurate positioning capabilities, accurate to $\frac{1}{1000}$th of an inch, are complex and expensive devices which are not easily adaptable to a variety of machines and power tools.

Less expensive mechanical positioning devices available are far less accurate in positioning capabilities and rely heavily on both the experience and the eyesight of the user. Many of these devices utilize a lead screw.

The present invention of a workpiece positioning device provides a highly accurate mechanical positioning device which can be incrementally positioned in increments as small as $\frac{1}{1000}$th of an inch relative to a reference point. This device can be precisely positioned incrementally in seconds by an ordinary user and does not require years of experience or exceptional eyesight to accurately position a workpiece for cutting or other procedures. The present invention is accurate, dependable and economical to manufacture. The preferred embodiment of the present invention is constructed of durable materials which will not wear out or break easily. The design of the present invention is simple in comparison to other devices which provide the same level of precision and accuracy in that there are not a lot of complex or expensive moving parts which add to the cost of other positioning devices and which have a higher risk of being damaged or broken. One embodiment of the present invention is a portable design wherein the workpiece positioning device can easily be transferred from one machine to another for efficiency of use in small shops.

SUMMARY OF THE INVENTION

The present invention provides a workpiece positioning device for precisely positioning a workpiece in a predetermined position relative to a power tool or other device quickly and efficiently. This device provides a simple and dependable apparatus for quickly and easily positioning a workpiece incrementally in increments as small as 0.0010 inches.

The present invention comprises a workpiece positioning device for positioning a workpiece to be worked upon by a power tool comprising a stationary base, an elongated locator member carried by the base for limited slideable movement right and left thereof, the locator member having a first set of axially aligned spaced-apart apertures therein, an elongated scale made fast to the base and disposed adjacent to said locator member. The invention further comprises a set of axially aligned spaced-apart through-apertures in the scale equal in diameter and in number to the apertures in the first set of apertures in the locator member, the locator member having a second set of axially aligned spaced-apart apertures therein.

The invention further comprises a fence having a surface thereon for abutting against a workpiece, the fence being disposed adjacent to the locator member for limited slideable movement right and left thereof. The fence having a set of axially aligned spaced-apart through-apertures therein equal in diameter to the apertures in the second set of apertures in the locator member, and the fence being incrementally positionable relative to the locator member by alignment of one of the apertures therein with one of the apertures in the second set of apertures in the locator member. The spacing of the apertures in the fence and the spacing of the second set of apertures in the locator member being different from each other by an amount equal to a first precise predetermined distance to facilitate fine positioning of the fence relative to the locator member. The locator member being incrementally positionable relative to the scale by alignment of one of the apertures in the first set of apertures in the locator member with one of the apertures in the scale. The spacing of the apertures in the scale and the spacing of the apertures in the first set of apertures in the locator member being different from each other by an amount equal to a second precise predetermined distance to facilitate precision positioning of the locator member relative to the scale.

The second precise predetermined distance being more precise than the first precise predetermined distance, whereby a workpiece abutting the fence will be exactly located in the precise position selected therefor.

In another aspect of the invention, only one positioning member is included to provide in one embodiment incremental positioning of a workpiece in increments of 0.0625 inches or smaller wherein the workpiece positioning device for precisely positioning a workpiece to be worked upon by a power tool comprises a stationary base, an elongated locator member carried by the base, the locator member having a set of axially aligned spaced-apart apertures therein, a fence having a surface thereon for abutting against a workpiece, the fence being disposed adjacent to the locator member for limited slideable movement right and left thereof, the fence having a set of axially aligned spaced-apart through-apertures therein equal in diameter to the apertures in the locator member, the fence being incrementally positionable relative to the locator member by alignment of one of the apertures therein with one of the apertures in the locator member. The spacing of the apertures in the fence and the spacing of the apertures in the locator member being different from each other by an amount equal to a precise predetermined distance to facilitate fine positioning of the fence relative to the locator member, whereby a workpiece abutting the fence will be exactly located in the precise position selected therefor.

The present invention, in the preferred embodiment provides a workpiece positioning device for precisely positioning a workpiece to be worked on by a power tool comprises a stationary base having a cavity therein, an elongated locator member disposed in the cavity for limited slideable movement right and left of the base, the locator member having a front portion and a rear portion thereof, the rear portion of the locator member having a set of axially aligned spaced-apart vertical apertures therein. An elongated scale is made fast to the base and disposed above the rear portion of the locator member. The invention further comprises a set of axially aligned spaced-apart vertical through-apertures in the scale equal in diameter and in number to the apertures in the rear portion of said locator member, the front portion of the locator member having a set of axially aligned spaced-apart blind-ended horizontal apertures therein. Also included is a fence having a surface thereon for abutting against a workpiece, the front portion of said locator member having a cavity therein, wherein a portion of the fence is disposed in the cavity in the front portion of the locator member for limited slideable movement right and left of the locator member. The invention further comprises a set of axially aligned spaced-apart horizontal through-apertures in the fence equal in diameter to the apertures in the front portion of the locator member. The fence being incrementally positionable relative to the locator member by alignment of one of the apertures therein with one of the apertures in the locator member. The invention further comprising a first pin means extendable through the fence and into one of the apertures in the front portion of the locator member for fixing whichever position of the fence is selected, wherein the spacing of the apertures in the fence and the apertures in the front portion of the locator member being different from each other by an amount equal to a first precise predetermined distance to facilitate fine positioning of the fence relative to the locator member. The locator member being incrementally positionable relative to the scale by alignment of one of the apertures in said rear portion thereof with one of the apertures in said scale, wherein a second pin means extendable through the scale and into one of the apertures in the rear portion for fixing whichever position of the locator member is selected. The spacing of the apertures in the scale and the apertures in the rear portion of the locator member being different from each other by an amount equal to a second precise predetermined distance to facilitate precision positioning of the locator member relative to the scale. The second precise predetermined distance being more precise than the first precise predetermined distance, whereby a workpiece abutting the fence will be exactly located in the precise position desired therefor.

In another aspect of the invention a workpiece positioning device is provided wherein the fine positioning of the fence relative to the locator member is effected by incremental movements of $1/16$th of an inch each.

Another aspect of the invention provides a workpiece positioning device wherein the precision positioning of the locator member relative to the scale is effected by incremental movements of $1/1000$th of an inch each.

The invention also provides a workpiece positioning device wherein the fine positioning of the fence relative to the locator member is effected by incremental movements of $1/16$th of an inch each, and wherein the precision positioning of the locator member relative to the scale is effected by incremental movements of $1/1000$th of an inch each.

In another aspect, the invention further comprises means on the scale for receiving a lever in a portion thereof and a detent means on the locator member upon which an end of the lever is operable for precise positioning of the locator member relative to the scale.

Another aspect of the invention comprises a ruler affixed to the scale for facilitating the positioning of the fence relative to the locator member.

The invention further comprises other aspects wherein the fence has opposite surfaces for alternately abutting against a workpiece and a removably attachable pivotal flip stop postionable for operation adjacent to either of the opposite surfaces. The invention further comprises removably attachable means associated with the fence and extending laterally the surface thereof which abuts the workpiece.

Still another aspect of the invention further comprises an extension member removably attachable to an end of the front portion of the locator member for extending the length of the front portion, the extension member having a set of axially aligned spaced-apart horizontal apertures therein identical to the set of apertures in said front portion, wherein the extension member comprises a cavity therein, a portion of the fence being disposable in the cavity in the extension member for limited slideable movement right and left of the extension member.

The present invention further comprises a workpiece positioning device wherein the apertures in the fence are sequentially numbered to facilitate fine positioning thereof relative to the locator member and wherein the apertures in the scale are sequentially numbered to facilitate precise positioning of the locator member thereto.

DETAILED DESCRIPTION OF THE PREFERRED EMBODIMENT

Detailed preferred embodiments of the present invention are disclosed. It is to be understood, however, that the disclosed embodiments are merely exemplary of the invention, which may be embodied in various forms. Therefore, specific structural and functional details disclosed are not to be interpreted as limiting, but rather as a representative basis for teaching one skilled in the art to variously employ the present invention in virtually any appropriately detailed system or structure. It will be understood that the drawings are not necessarily to scale, and relative component sizes may be exaggerated to facilitate an understanding of the invention.

The present invention relates to equipment designed to a workpiece positioning device for precisely positioning a workpiece relative to a power tool or other device quickly and efficiently. This device can be used with a wide variety of tools and machines in various applications.

Figure 1:
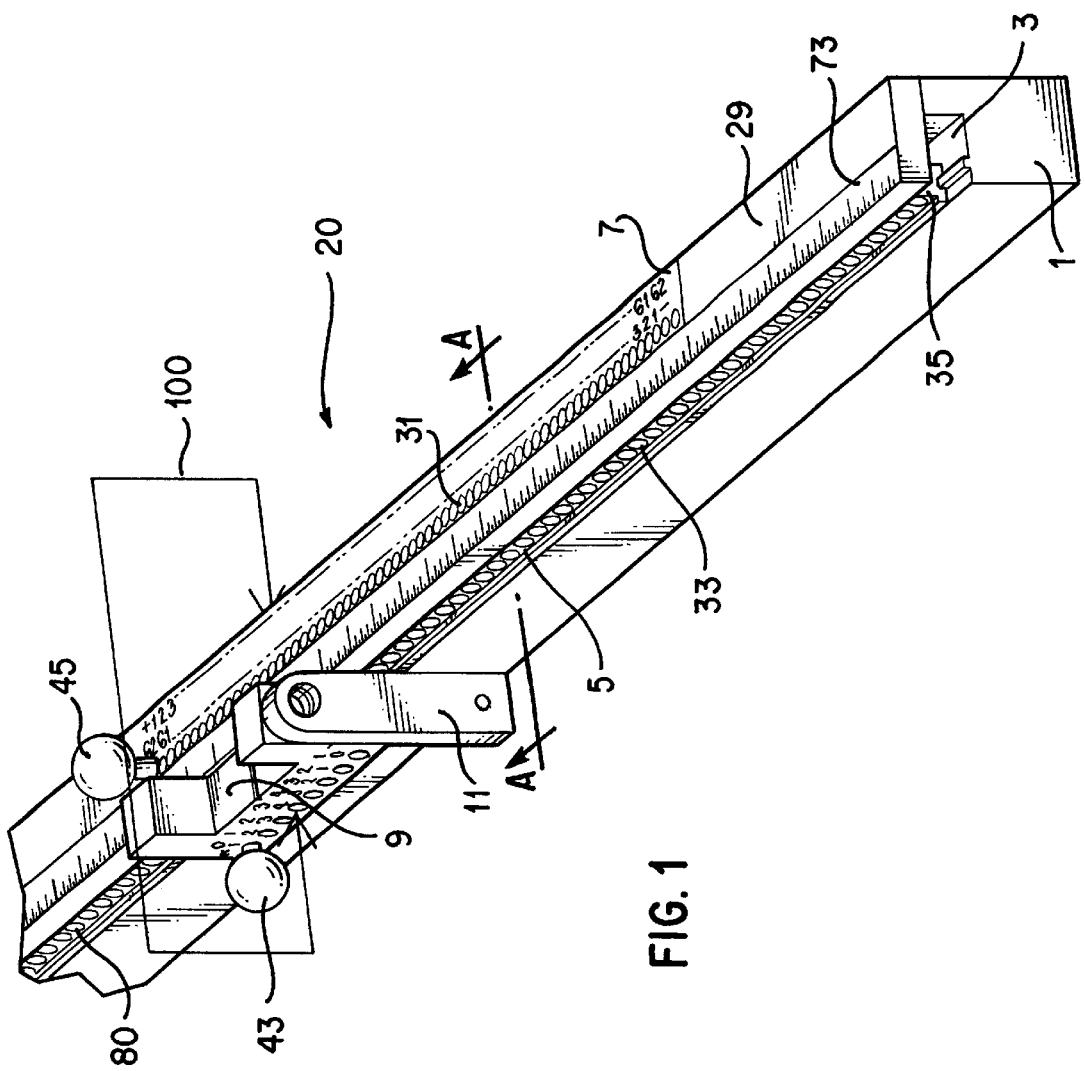
FIG. 1 is a perspective view of an embodiment of the workpiece positioning device of the present invention.

Referring to the drawings, wherein like numerals represent like parts throughout the several views, the preferred embodiment of the workpiece positioning device of the present invention, generally 20 in FIG. 1 comprises a stationary base 1, an elongated locator member 5, carried by the base 1, is slideable left and right of the base 1. An elongated scale 7, made fast to the base 1, is positioned above the locator member 5. A fence 9 disposed adjacent to the locator member 5 is slideable left and right of thereof. A workpiece abutting the fence 9 can be exactly positioned in a predetermined position by selectively fine positioning the fence 9 relative to the locator member 5, and selective precision positioning of the locator member 5 relative to the scale 7. A flip stop 11 is shown in FIG. 1 attached to fence 9 for abutting the workpiece in some applications of the workpiece positioning device 20.

Following, each of the components of the workpiece positioning device will be discussed in detail.

Figure 2:
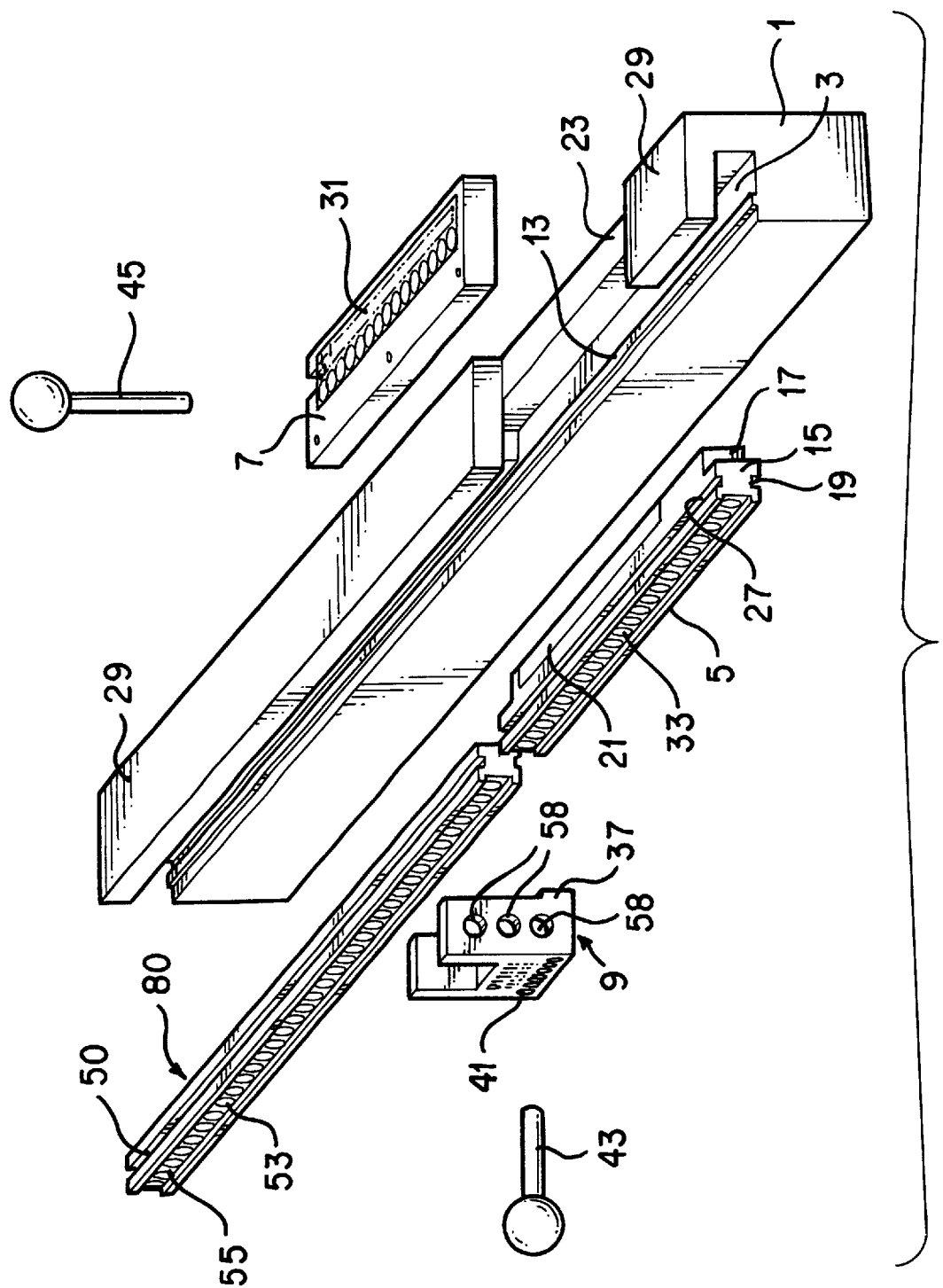
FIG. 2 is an exploded view of the workpiece positioning device of FIG. 1.
Figure 3:
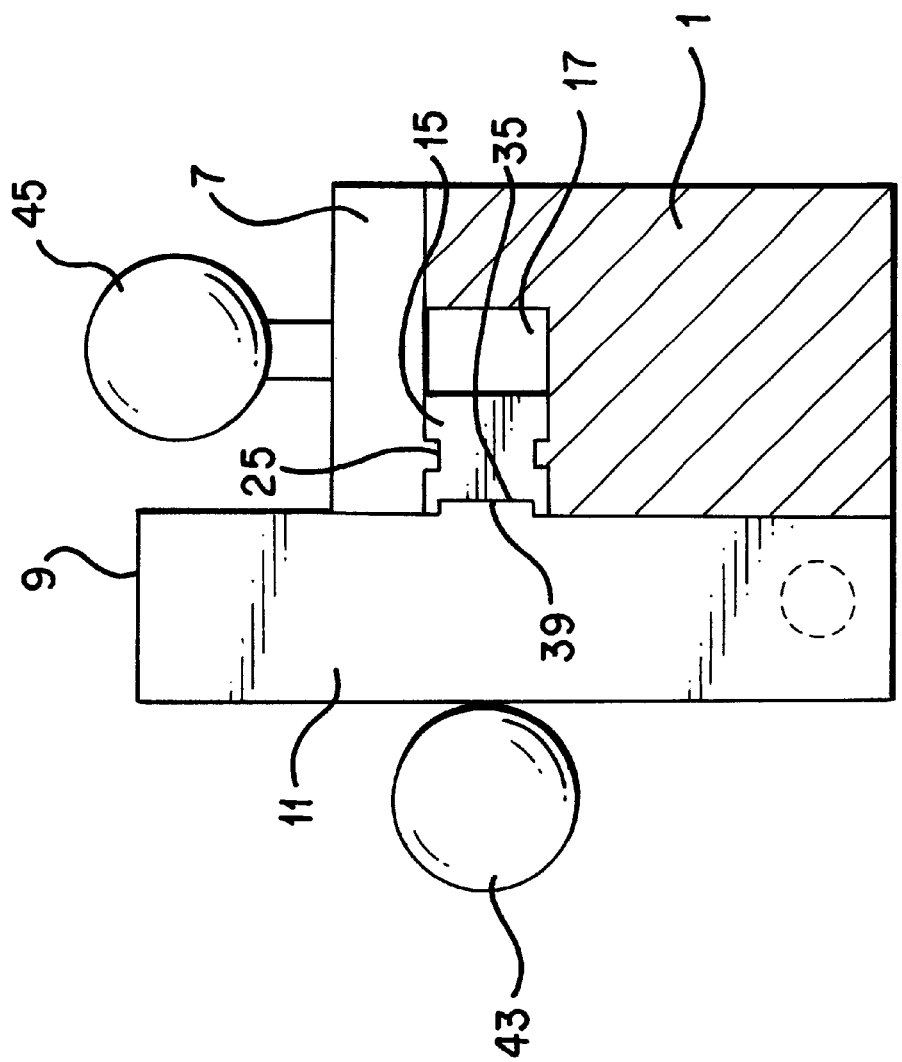
FIG. 3 is a cross sectional view of the workpiece positioning device taken at line A—A on FIG. 1.
Figure 4:
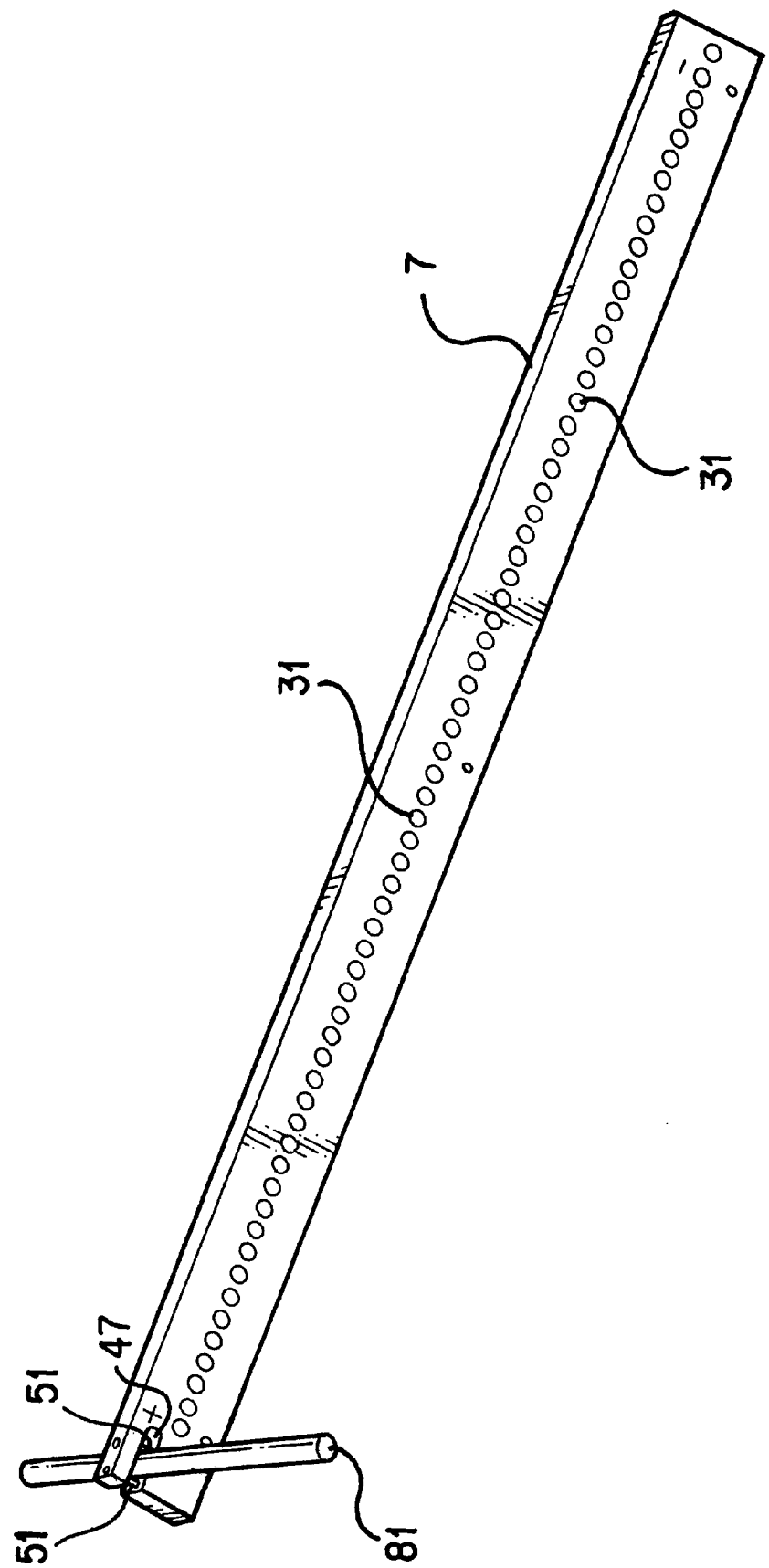
FIG. 4 is a perspective view of the scale.

Referring again to FIG. 1 the base 1 is stationary relative to the power tool or reference point for which the positioning device is being used. An elongated locator member 5 is disposed in cavity 3 of the base 1. As shown in FIG. 2, locator member 5 comprises front portion 15 and rear portion 17. Rear portion 17 of the locator member has a set of axially aligned spaced-apart vertical apertures, 21 therein. An elongated scale 7, shown in FIGS. 1 and 2 is positioned above the locator member 5 and attached to support portion 23 of base 1. As shown in FIG. 2, groove 19 on the bottom surface of front portion 15 receives tongue 13 of the base 1. Similarly, groove 27 on front portion 15 of the locator member 5 receives tongue 25 on the lower surface of the scale 7 as shown in FIG. 3. Locator member 5 positioned in cavity 3 of the base 1 and below scale 7 is limited to slideable movement left and right relative to base 1 and scale 7 by tongue and grooves, (13 and 19) and (25 and 27), respectively. End caps 29 positioned at the ends of scale 7 and above the base 1 and locator member 5 are attached to the base 1 and each have a tongue on their lower surface identical to tongue 25 on the lower surface of scale 7. Said tongue on the lower surface of the end caps 29 engage grooves 27 and 50 on the locator member 5 and the extension member 80 respectively. End caps 29 retain the locator member 5 and extension member 80 in cavity 3 and also prevent scale 7 from movement in a direction parallel to the left and right movement of the locator member 5 relative to the base 1.

Figure 6:
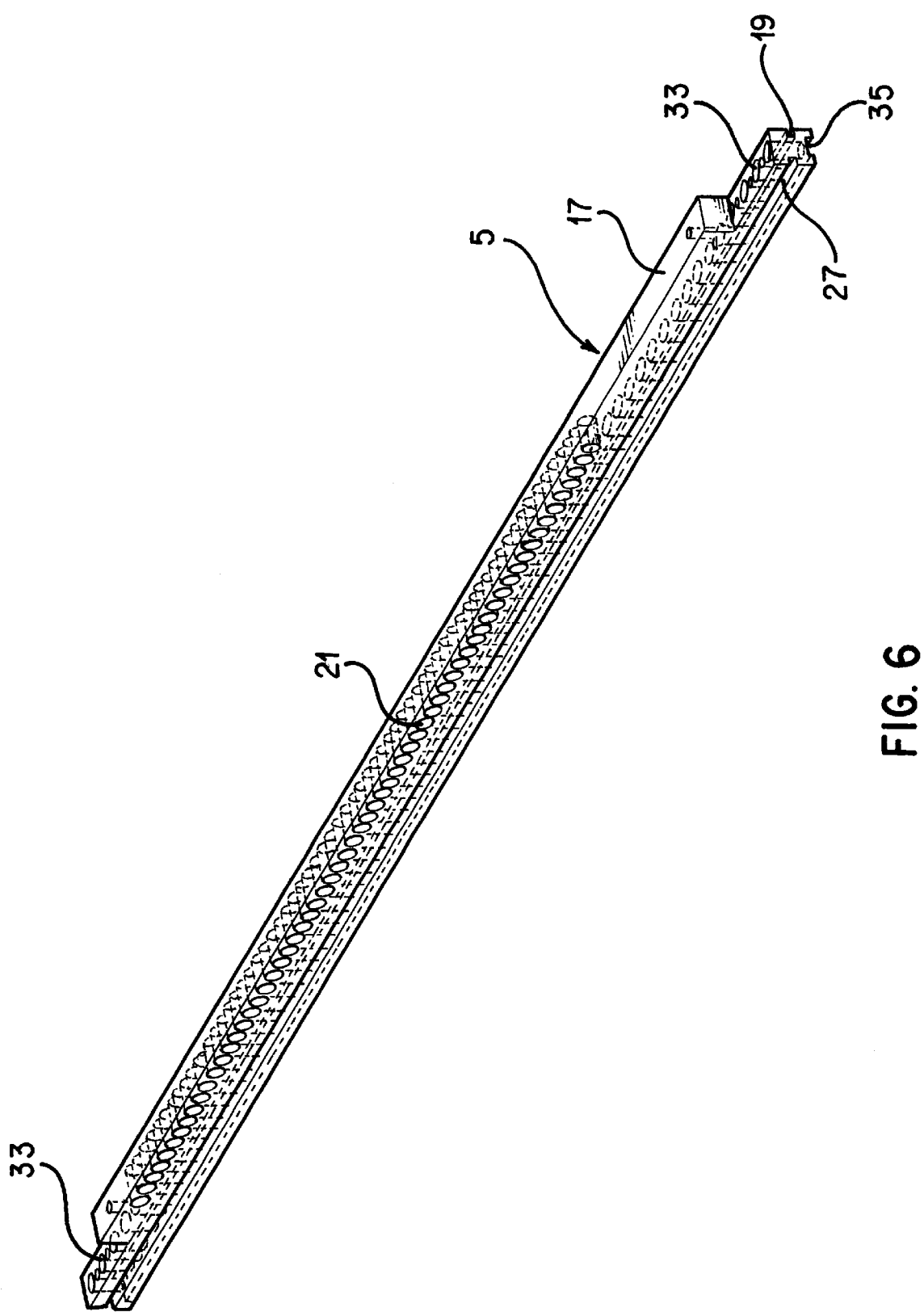
FIG. 6 is a perspective view of the locator member.

A set of axially aligned spaced-apart vertical through-apertures, 31 in scale 7 are in alignment perpendicular to the slideable movement of locator member 5 with the set of axially aligned spaced-apart vertical apertures 21 in the rear portion 17 of locator member 5. A detailed drawing of locator member 5 is shown in FIG. 6. The set of axially aligned spaced-apart through apertures 31 in the scale 7 are equal in diameter and in number to the set of apertures 21 in the rear portion 17 of the locator member 5.

Figure 5:
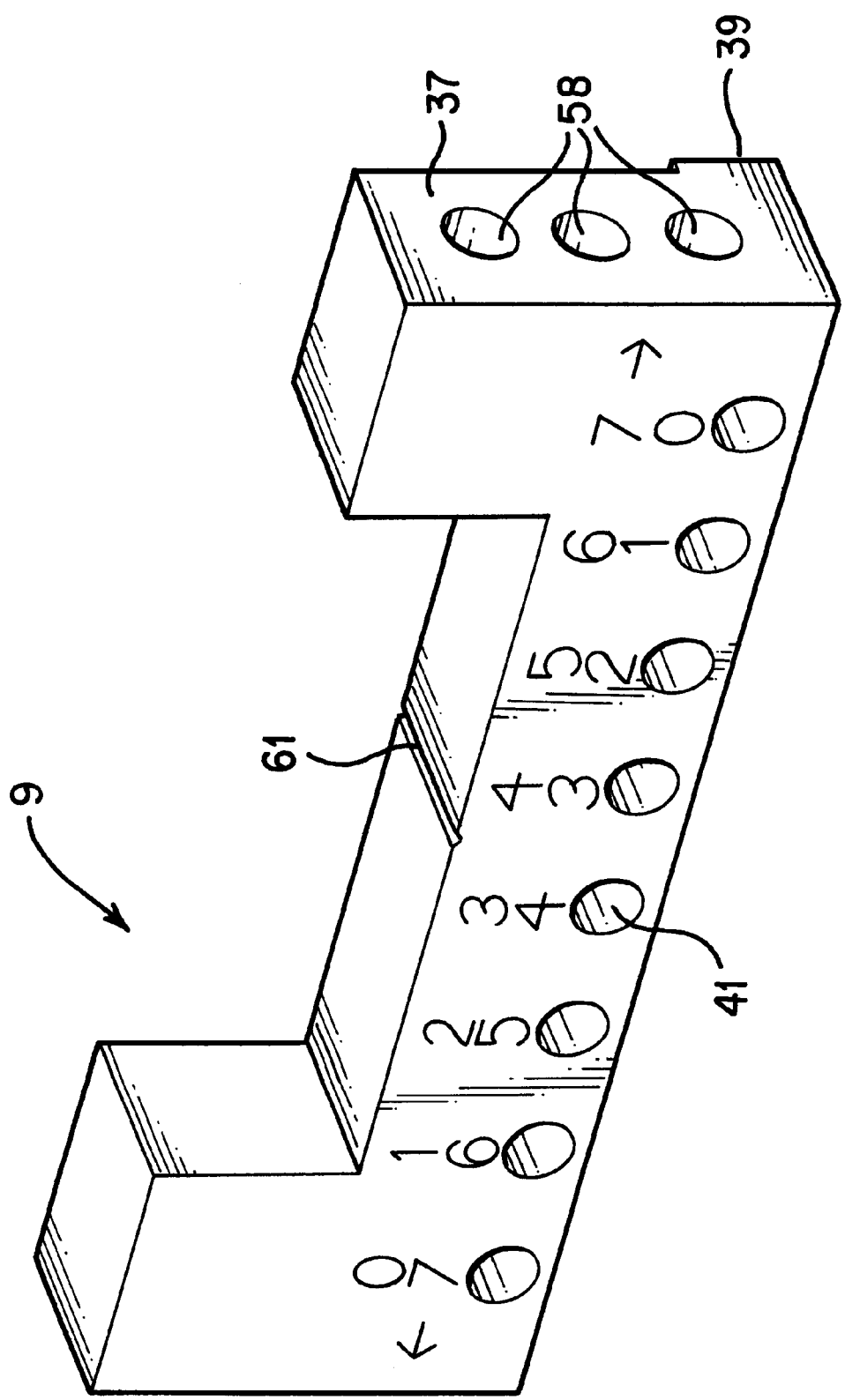
FIG. 5 is a perspective view of the fence.

As shown in FIGS. 1 and 2, the front portion 15 of the locator member 5 has a set of axially aligned spaced-apart blind-ended horizontal apertures 33 in cavity 35. Fence 9, as shown in FIG. 5 has opposite surfaces 37 for abutting against a workpiece on either the left or right end thereof. FIG. 3 shows protrusion 39 on the rear surface of fence 9 disposed in cavity 35 of front portion 15 which provides limited slideable movement left and right of the fence 9 relative to the locator member 5. A set of axially aligned spaced-apart horizontal through-apertures 41 in the front surface of the fence 9 are equal in diameter to the apertures 33 in the front portion 15 of the locator member 5. Vertical alignment between the set of apertures 41 in the fence 9 and the set of apertures 33 in the front portion 15 of the locator member 5 is maintained by the protrusion 39 on the rear surface of the fence 9 being disposed in cavity 35 on the front portion 15 of the locator member 5.

The fence 9 is incrementally positionable relative to the locator member 5 by aligning manually one of the apertures 41 in the fence 9 with one of the apertures 33 in the front portion 15 of the locator member 5. A first pin 43 placed through the selected aperture of the apertures 41 in the fence 9 and into one of the apertures 33 in the front portion 15 of the locator member 5 fixes the selected position of the fence 9 relative to the locator member 15.

The spacing of the apertures 41 in the fence 9 and the apertures 33 in the front portion 15 of the locator member 5 being different from each other by an amount equal to a first precise predetermined distance to facilitate fine positioning of the fence 9 relative to the locator member 5.

In the preferred embodiment the spacing of the apertures 41 in the fence 9 are 0.5625 inches and the spacing of the apertures 33 in the front portion 15 of the locator member are 0.5 inches. Fine positioning of the fence 9 relative to the locator member 5 can be incrementally adjusted in the preferred embodiment in increments equal to the difference in the spacing of the apertures 41 in the fence 9 and the apertures 33 in the front portion 15 of the locator member 5 which is equal to (0.5625–0.5) inches or 0.0625 inches. Thus, in the preferred embodiment, fine positioning of the fence 9 relative to the locator member 5 is effected by incremental movements of 1/16-th of an inch each.

In the preferred embodiment as shown in FIG. 5, the apertures 41 in the fence are numbered sequentially from 0–7 to facilitate fine positioning of the fence 9 relative to the locator member 5 in a left or right motion equal to the number of the aperture selected in the set of apertures in the fence 9 times the predetermined increment (0.0625 inches in the preferred embodiment). Scribe mark 61 designates the center of fence 9 and is positioned to align with ruler 73 affixed to the scale 7 and end caps 29 to enable the user to quickly position the fence relative to locator member 5 and the power tool or other device.

The locator member 5 is incrementally positionable relative to scale 7 by aligning one of the apertures 21 in the rear portion 17 of the locator member 5 with a selected one of the apertures 31 in the scale 7. As shown in FIGS. 1 and 2, a second pin 45 placed through a selected one of the apertures of the set of apertures 31 in the scale 7 and into one of the apertures 21 in the rear portion 17 of the locator member 5 fixes the selected position of the locator member 5 relative to the scale 7.

The spacing of the apertures 31 in the scale 7 and the apertures 21 in the rear portion 17 of the locator member 5 being different from each other by an amount equal to a second precise predetermined distance to facilitate precision positioning of the locator member 5 relative to the scale 7.

In the preferred embodiment the spacing of the apertures 31 in the scale 7 is 0.3115 inches and the spacing of the apertures 21 in the rear portion 17 of the locator member is 0.3125 inches. Precision positioning of the locator member 5 can be incrementally adjusted in the preferred embodiment in increments equal to the difference in the spacing of the apertures 21 in the rear portion 17 of the locator member 5 and the spacing of the apertures 31 in the scale 7 which is equal to (0.3125–0.3115) inches or 0.0010 inches. Thus, in the preferred embodiment, precision positioning of the locator member 5 relative to the locator member 7 is effected by incremental movements of 1/1000-th of an inch each either to the left or to the right of base 1.

Figure 7:
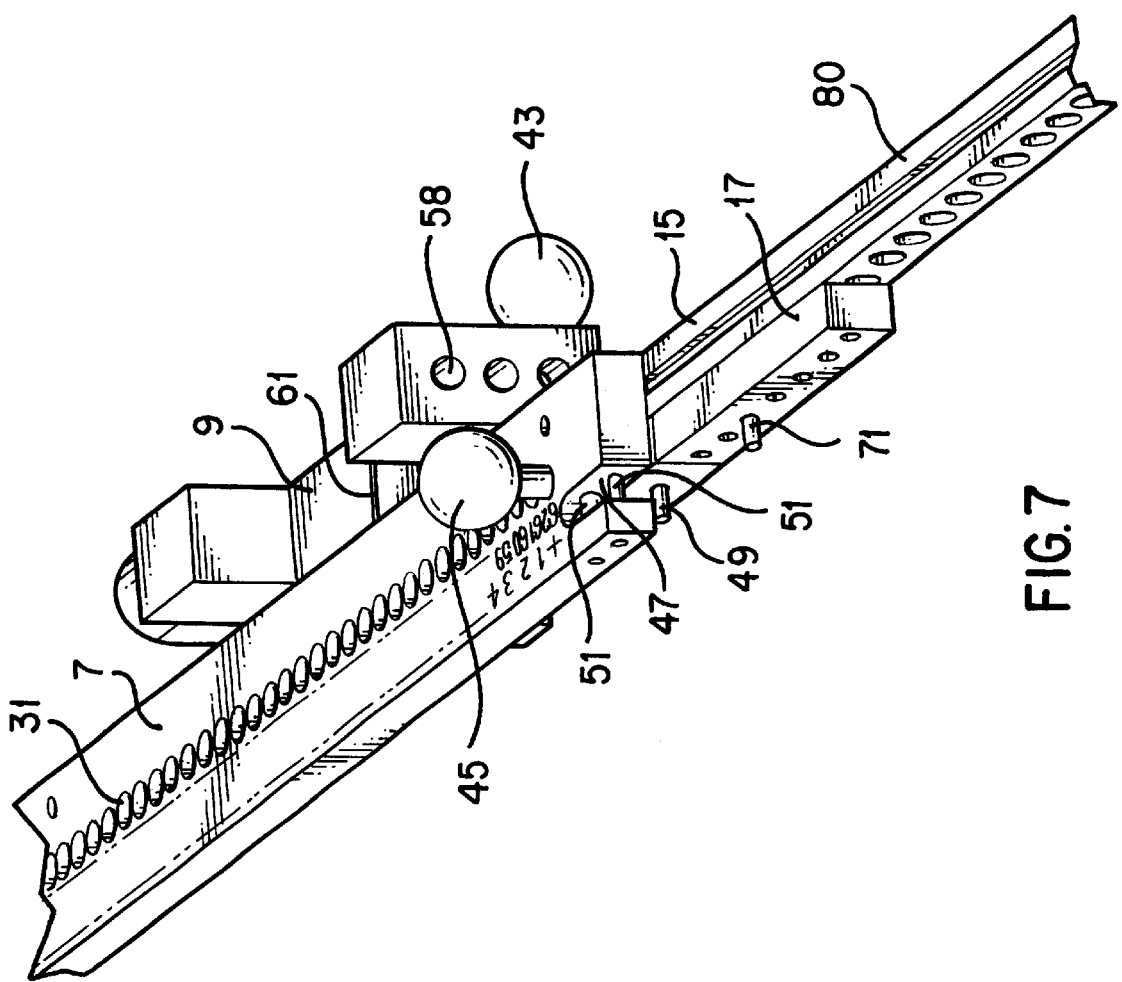
FIG. 7 is a perspective view of the opposite end of the workpiece positioning device of FIG. 1 excluding the base.
Figure 8:
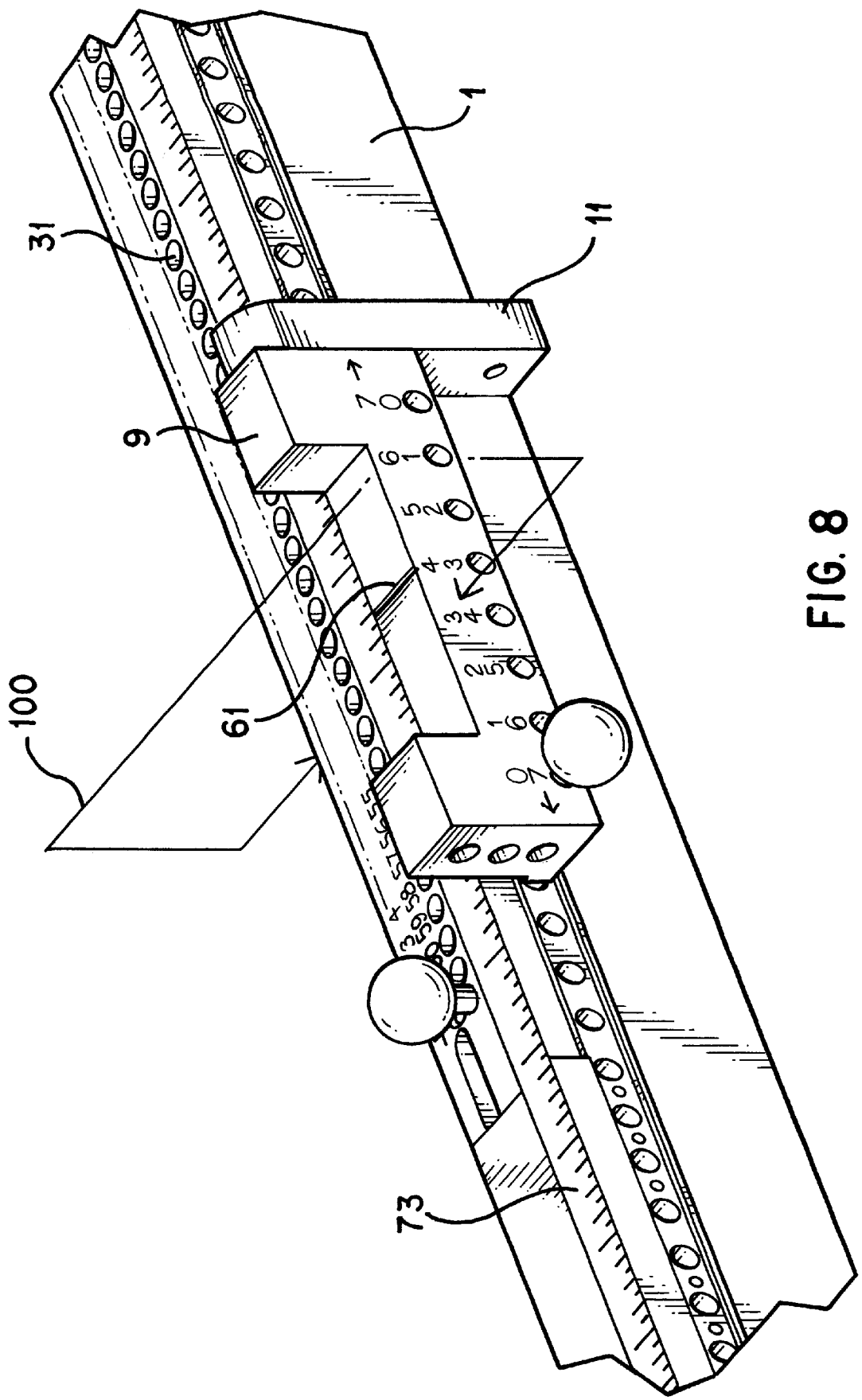
FIG. 8 is a perspective view of the FIG. 1 embodiment of the workpiece positioning device.

In the preferred embodiment as shown in FIGS. 7 and 8, the apertures 31 in the scale are double numbered sequentially from 0–63 to facilitate precision positioning of the locator member 5 relative to the scale 7 in a left or right motion equal to the number of the aperture selected in the set of apertures in the scale 31 times the predetermined increment (0.001 inches in the preferred embodiment). Limiting pin 71, shown in FIG. 7 limits the range of movement of the locator member 5 to the maximum precision positioning adjustment in either direction of the locator member 5 relative to the scale 7. In the preferred embodiment the maximum range of movement of the locator member 5, left or right, relative to the scale 7 is 63 times 0.001 inches or 63/1000 inches which is slightly more than 1/16-th of an inch.

In the preferred embodiment all of the following apertures including the set of vertical through-apertures 31 in the scale, the vertical apertures 21 in the rear portion 17 of the locator member 5, the horizontal apertures 33 and 53 in the front portion 15 of the locator member 5 and the extension member 53 respectively and the horizontal apertures in the fence are 0.250 inches in diameter. The pins 43 and 45 are hardened steel also 0.250 inches in diameter for a precision fit in the apertures mentioned above.

Ruler 73 as shown in FIGS. 1 and 8 is affixed to scale 7 and end caps 29, for facilitating the positioning of the fence 9 relative to the locator member 5 and to the workpiece. Extension member 80, as shown in FIG. 2, is removably attachable to an end of the front portion 15 of the locator member 5 for extending the length of the front portion 15. Extension member 80 comprises a set of axially aligned spaced-apart horizontal apertures 53 therein identical to the set of apertures 33 in the front portion 15 of the locator member 5. Protrusion 39 on the rear surface of fence 9 is disposable in cavity 55 in extension member 80. Cavity 55 in the extension member 80 is identical to cavity 35 in the front portion 15 of locator member 5.

Means on the scale for receiving a lever is shown on FIG. 7 as slot 47 in the preferred embodiment. A pin 49 perpendicular to the limited slideable movement of locator member 5 is the detent means on the locator member 5 upon which an end of a lever is operable for effecting the precise positioning of the locator member 5 relative to the scale 7. A pair of pins 51 affixed to the scale 5 perpendicular to the direction of the limited slideable movement of the locator member 5 relative to the scale 7, serve as a fulcrum for the lever.

Compressive force applied at 100 as shown in FIGS. 1 and 8 secures the selected position of the fence 9 relative to locator member 5. The compressive force can be any available means such as a spring clamp.

In the preferred embodiments the base 1 is constructed from a baltic birch laminate, however many other materials would function as well. The fence 9, locator member 5. scale 7, and extension members 80. in the preferred embodiments are constructed of 6061-T6 extruded aluminum with SANFORD hard coating. This material is lightweight yet extremely hard and durable enabling the precision drilling of the apertures and providing for highly accurate long time usefulness.

In the preferred embodiment locator member 5, scale 7 and fence 9 are designed symmetrically such that each can be reversed end for end thereby increasing the longevity of the individual components.

A person skilled in the art will readily appreciate that the workpiece positioning device of the present invention can achieve extremely accurate precision, repeatable incremental accuracy, with fast positioning capabilities and does not require a user to have years of experience or a high level of expertise to use. The accuracy of the device of the present invention does not depend greatly on the eyesight of the user.

The method of using the workpiece positioning device of the preferred embodiment of the present invention is as follows:

Fence 9 is positioned to the nearest ½ inch of the desired position by aligning scribe 61 on the fence 9 with the proper ½ inch mark on ruler 73 relative to locator member 5 and the power tool by referencing ruler 73. Fence 9 is then shifted incrementally 1/16-th of an inch either left or right to the within 1/16-th of an inch of the final position by choosing the proper aperture in the fence 9 of the set of apertures 41. The set of apertures 41 in the fence 9 are numbered 0–7 designating the number of incremental shifts of 1/16-th inch each the fence is to be shifted, either left or right with respect to the locator member 5, to be positioned within 1/16-th of an inch of the final position of the fence 9 relative to the tool. Pin 43 is inserted through the selected numbered aperture of the set of apertures 41 in the fence 9 and into the aligned aperture of the set of apertures 33 in the front portion of the locator member 5. Next the desired exact location of the fence is obtained by inserting the pin 45 in the selected numbered aperture of the set of apertures 31 in the scale 7 and by moving scale 7 with a lever to align the underlying aperture in the set of apertures 21 in the locator member 5. By inserting pin 45 into the aligned aperture in the set of apertures 21 the position of the locator member 5 the position of the locator member 5 is fixed relative to the scale 7 and the base 1, thereby fixing the position of the fence relative to the tool. The final 1/16-th inch of the position of the fence is incrementally divided into 63 1/1000-th of an inch increments ech designated by one of the numbered apertures of the set of apertures 31 in scale 7. Apertures 31 in scale 7 are double numbered incrementally starting from both the left and right to facilitate fast placement of pin 45 in scale 7 whether the precision positioning of the locator member relative to the base is either left or right thereof. A spring clamp can be installed at position designated 100 in FIG. 1 to secure the position of fence 7 during the cutting or other work done to the workpiece.

It will be readily apparent to those skilled in the art that many modifications to the preferred embodiment of the present invention are possible without deviating from the scope and spirit of the present invention. For instance it will be readily understood by those skilled in the art upon reading and understanding this specification and drawings that the present invention can be used with in a wide variety of applications spanning many industries. Also understood is that the workpiece positioning device of the present invention can be adapted for use with any unit of measurement and tolerances for the incremental positioning of a workpiece relative to a reference point or tool.

The applicant has suggested that some of the many uses of the workpiece positioning device of the present invention are applications involving chop saws, table saws, drill machines and quality control machines among others. One skilled in the art will acknowledge that there are many other applications wherein the present invention can be used as a positioning device.

Thus, while the present invention has been described with preferred embodiments thereof, it will be understood that many modifications will be readily apparent to those skilled in the art. Therefore, it is intended that this invention be limited only by the claims and the equivalents thereof.

What is claimed is:

1. A workpiece positioning device for precisely positioning a workpiece to be worked upon by a power tool comprising:

a stationary base, an elongated locator member carried by the base for limited slideable movement right and left thereof, said locator member having a first set of axially aligned spaced-apart apertures therein, an elongated scale made fast to the base and disposed adjacent to said locator member, a set of axially aligned spaced-apart through-apertures in said scale equal in diameter and in number to the apertures in the first set of apertures in the locator member, said locator member having a second set of axially aligned spaced-apart apertures therein, a fence having a surface thereon for abutting against a workpiece, said fence being disposed adjacent to the locator member for limited slideable movement right and left thereof, said fence having a set of axially aligned spaced-apart through-apertures therein equal in diameter to the apertures in the second set of apertures in the locator member, said fence being incrementally positionable relative to the locator member by alignment of one of the apertures therein with one of the apertures in said second set of apertures in the locator member, the spacing of the apertures in the fence and the spacing of the second set of apertures in the locator member being different from each other by an amount equal to a first precise predetermined distance to facilitate fine positioning of the fence relative to the locator member, the locator member being incrementally positionable relative to the scale by alignment of one of the apertures in the first set of apertures in the locator member with one of the apertures in said scale, the spacing of the apertures in the scale and the spacing of the apertures in the first set of apertures in the locator member being different from each other by an amount equal to a second precise predetermined distance to facilitate precision positioning of the locator member relative to the scale, the second precise predetermined distance being more precise than the first precise predetermined distance, and whereby a workpiece abutting the fence will be exactly located in the precise position selected therefor.

2. A workpiece positioning device for precisely positioning a workpiece to be worked upon by a power tool comprising:

a stationary base, an elongated locator member carried by the base, said locator member having a set of axially aligned spaced-apart apertures therein, a fence having a surface thereon for abutting against a workpiece, said fence being disposed adjacent to the locator member for limited slideable movement right and left thereof, said fence having a set of axially aligned spaced-apart through-apertures therein equal in diameter to the apertures in the locator member, said fence being incrementally positionable relative to the locator member by alignment of one of the apertures therein with one of the apertures in said locator member, the spacing of the apertures in the fence and the spacing of the apertures in the locator member being different from each other by an amount equal to a precise predetermined distance to facilitate fine positioning of the fence relative to the locator member, and whereby a workpiece abutting the fence will be exactly located in the precise position selected therefor.

3. A workpiece positioning device for precisely positioning a workpiece to be worked on by a power tool comprising:

a stationary base having a cavity therein, an elongated locator member disposed in said cavity for limited slideable movement right and left of said base, said locator member having a front portion and a rear portion thereof, said rear portion of said locator member having a set of axially aligned spaced-apart vertical apertures therein, an elongated scale made fast to the base and disposed above the rear portion of said locator member, a set of axially aligned spaced-apart vertical through-apertures in said scale equal in diameter and in number to the apertures in the rear portion of said locator member, said front portion of said locator member having a set of axially aligned spaced apart blind-ended horizontal apertures therein, a fence having a surface thereon for abutting against a workpiece, said front portion of said locator member having a cavity therein, a portion of said fence being disposed in the cavity in said front portion of said locator member for limited slideable movement right and left of said locator member, a set of axially aligned spaced-apart horizontal through-apertures in said fence equal in diameter to said apertures in the front portion of said locator member, said fence being incrementally positionable relative to the locator member by alignment of one of the apertures therein with one of the apertures in said locator member, a first pin means extendable through the fence and into one of the apertures in the front portion of the locator member for fixing whichever position of the fence is selected, the spacing of the apertures in the fence and the apertures in the front portion of the locator member being different from each other by an amount equal to a first precise predetermined distance to facilitate fine positioning of the fence relative to the locator member, said locator member being incrementally positionable relative to the scale by alignment of one of the apertures in said rear portion thereof with one of the apertures in said scale, a second pin means extendable through the scale and into one of the apertures in said rear portion for fixing whichever position of the locator member is selected, the spacing of the apertures in the scale and the apertures in the rear portion of the locator member being different from each other by an amount equal to a second precise predetermined distance to facilitate precision positioning of the locator member relative to the scale, the second precise predetermined distance being more precise than the first precise predetermined distance, and whereby a workpiece abutting the fence will be exactly located in the precise position desired therefor.

4. A workpiece positioning device as claimed in claim 3 wherein the fine positioning of the fence relative to the locator member is effected by incremental movements of $\frac{1}{16}$th of an inch each.

5. A workpiece positioning device as claimed in claim 3 wherein the precision positioning of the locator member relative to the scale is effected by incremental movements of $\frac{1}{1000}$th of an inch each.

6. A workpiece positioning device as claimed in claim 3 wherein the fine positioning of the fence relative to the locator member is effected by incremental movements of $\frac{1}{16}$th of an inch each, wherein the precision positioning of the locator member relative to the scale is effected by incremental movements of $\frac{1}{1000}$th of an inch each.

7. A workpiece positioning device as claimed in claim 3 further comprising means on the scale for receiving a lever in a portion thereof, detent means on the locator member upon which an end of the lever is operable for precise positioning of the locator member relative to the scale.

8. A workpiece positioning device as claimed in claim 3 further comprising a ruler affixed to the scale for facilitating the positioning of the fence relative to the locator member.

9. A workpiece positioning device as claimed in claim 3 wherein said fence has opposite surfaces for alternately abutting against a workpiece.

10. A workpiece positioning device as claimed in claim 9 further comprising a pivotal flip stop postionable for operation adjacent to either of said opposite surfaces.

11. A workpiece positioning device as claimed in claim 3 further comprising removably attachable means associated with said fence and extending laterally the surface thereof which abuts the workpiece.

12. A workpiece positioning device as claimed in claim 3 further comprising an extension member removably attachable to an end of the front portion of said locator member for extending the length of said front portion, said extension member having a set of axially aligned spaced-apart horizontal apertures therein identical to the set of apertures in said front portion.

13. A workpiece positioning device as claimed in claim 12 wherein said extension member comprises a cavity therein, a portion of said fence being disposable in the cavity in said extension member for limited slideable movement right and left of said extension member.

14. A workpiece positioning device as claimed in claim 3 wherein the apertures in said fence are sequentially numbered to facilitate fine positioning thereof relative to the locator member.

15. A workpiece positioning device as claimed in claim 3 wherein the apertures in said scale are sequentially numbered to facilitate precise positioning of the locator member relative thereto.

* * * * *